United States Patent [19]

Hudler

[11] 4,281,243

[45] Jul. 28, 1981

[54] APPARATUS FOR DETECTING POSTAGE STAMPS ON ENVELOPES

[76] Inventor: Heinz Hudler, Ketzergasse 389, 1235 Wien, Austria

[21] Appl. No.: 35,961

[22] Filed: May 4, 1979

[30] Foreign Application Priority Data

Jun. 8, 1978 [AT] Austria ................................ 4101/78

[51] Int. Cl.³ ................................................ G01V 9/04

[52] U.S. Cl. ................................................ 250/223 R

[58] Field of Search ........................ 250/223, 555, 548; 235/92 V

[56] References Cited

U.S. PATENT DOCUMENTS 3,446,978 5/1969 Leavens ........................... 250/223 R 3,780,310 12/1973 Hudler ................................ 250/555

3,983,388 9/1976 Gugliotta ......................... 250/223 R

*Primary Examiner*—David C. Nelms

*Attorney, Agent, or Firm*—John T. O'Halloran; Alfred C. Hill

[57] ABSTRACT

The apparatus for detecting a perforated postage stamp on envelopes travelling in a given direction comprises a light source to illuminate the teeth of a perforated edge of the stamp at a right angle to the given direction; a scanning device receiving light from the iluminated edge of the stamp and producing a high frequency pulse train responsive to scanning the teeth of the illuminated edge of the stamp; and an evaluating circuit responsive to the pulse train to provide an indication of the presence of the stamp.

14 Claims, 2 Drawing Figures

APPARATUS FOR DETECTING POSTAGE STAMPS ON ENVELOPES

BACKGROUND OF THE INVENTION

The present invention relates to apparatus for detecting normal, perforated, untreated postage stamps on envelopes in a machine, in which the letters are moved in one direction, comprising a light source for illuminating the envelopes at a small angle and a photoelectric scanning device.

U.S. Pat. No. 3,780,310, issued to H. Hudler, the applicant of the present application, describes an optical method by which normal, untreated postage stamps can be detected just as reliably as treated stamps can be detected by known methods. This is accomplished in accordance with the cited patent by the utilization of a feature which is common to all postage stamps, namely, the presence of perforations at the edge of the stamp. That feature can be utilized for detection because it constitutes a reliable code and the perforations can be provided by up-to-date machines with a substantially exact pitch. In the apparatus according to the cited patent, the light source is so arranged that the light rays make an acute angle with the plane in which the envelopes are conveyed so that the stamps are illuminated from the side with a scanning spotlight beam in such a manner that the sides of the teeth of the perforated edges are brightly illuminated and the evaluating device which controls a switching device can detect the illuminated edge of the postage stamp as an indication of the presence of the stamp.

The apparatus according to the cited patent is used to scan that perforated edge of the postage stamp which extends parallel to the direction of travel of the stamp and when the teeth of the postage stamps which succeed each other in the direction of travel move past the scanning device the latter generates a low-frequency pulse train, which indicates to the evaluating circuit the presence of a postage stamp. Because the location of the adhesively fixed postage stamp is not exactly known, it is necessary to scan a wide strip. For this reason, the scanning device consists of a relatively large number of photodiodes, which are connected in parallel to each other and to respective amplifier channels. During the scanning, a signal which indicates the perforate edge is transmitted only by one channel and the other channels may transmit interfering signals which may be due to folded edges or rough paper of the envelope or to similar causes. A considerable electronic expenditure is required to decrease this high susceptibility to interference.

SUMMARY OF THE INVENTION

The present invention relates to an extension and further development of the apparatus according to the cited patent. It is an object of the present invention to substantially reduce the electronic expenditure which is required for the apparatus according to the cited patent and the susceptibility of such apparatus to interference.

A feature of the present invention is the provision of apparatus for detecting a perforated postage stamp on envelopes travelling in a given direction comprising: a light source directed to illuminate teeth of a perforated edge of the stamp at a right angle to the given direction; a scanning device disposed to receive light from the illuminated edge of the stamp and to produce a high frequency pulse train responsive to scanning the teeth of the illuminated edge of the stamp; and an evaluating circuit coupled to the scanning device responsive to the pulse train to provide an indication signal indicating the presence of the stamp.

In accordance with the present invention, the teeth on the perforated edge which is at right angles to the direction of travel of the envelopes are electronically scanned by a linear diode array which is controlled by a high-frequency pulse generator. The switching operations required for the line-by-line scanning of the postage stamp are derived from the travel of the latter. Because the several strips are scanned serially rather than in parallel, one amplifier channel is sufficient so that the electronic expenditure is greatly reduced and the signal-to-noise ratio is decisively increased.

Because the speed of the scanning at right angles to the direction of travel must greatly exceed the speed of travel, the photoelectric scanning device used according to the present invention includes an integrated linear array of diodes, which are electronically controlled. Since that monolithic semiconductor component is very small, a very small-scale image of the scanned perforated edge of the postage stamp must be produced on the light-sensitive portion of the linear diode array. This problem has been solved according to the invention by the use of a spherical lens system which has a small focal length. To enable a sufficiently exact reproduction of the perforated edge which is subjected to a substantially point-to-point scanning, the number of diodes of the linear diode array used according to the present invention is a multiple of the number of teeth of the perforated edge which are to be scanned.

A further feature of the present invention relates to the photoelectric scanning device and/or the evaluating circuit, which comprises a delay line, e.g., a shift register, which stores the information obtained from each scanned line and delivers said information only together with the information from the next line. This enables an overlapping of lines so that the detection of postage stamps which have been affixed in an oblique position is improved.

In order to improve the detection and to eliminate interfering pulses, the pulse-counting circuit for initiating the generation of a stamp-indicating signal after the receipt of a predetermined, adjustable number of pulses is so designed, in accordance with the present invention, that said circuit restores the count to zero if pulses have not been counted in the number required for the indication of a stamp and additional pulses are not received, or if the pulse frequency of the pulses which are received does not correspond to the tooth pitch of the postage stamp. According to a further feature of the present invention, a satisfactory function is ensured in that the evaluating device is so designed that after the transmission of a stamp-indicating signal to the switching device the evaluating device disables the counting circuit until the next envelope is to be checked.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
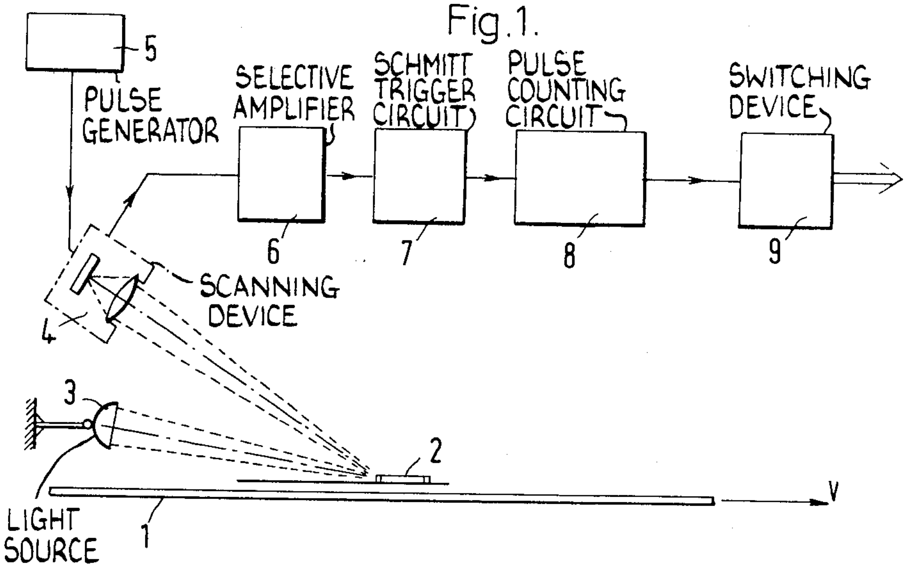
FIG. 1 is a side elevation showing the apparatus according to the principles of the present invention.

Referring to FIG. 1, the overall arrangement comprises a belt conveyor 1, by which an envelope carrying a stamp 2 is moved at a constant speed v past a photoelectric scanning device 4. The envelope and stamp 2 are illuminated by a light source 3. The illumination must be effected by means of a scanning spotlight beam, which is strongly laterally directed onto that perforated edge of stamp 2 which is at right angles to the direction of travel. Scanning device 4 comprises a spherical lens system and a self-scanned integrated linear diode array. Particularly as regards the angle between its optical axis and the direction of travel, scanning device 4 is so arranged that it produces an optimum image of the perforated edge of stamp 2 on the linear diode array.

The linear diode array of scanning device 4 is controlled by a pulse generator 5 and delivers a high-frequency output voltage, which corresponds to the perforated edge, to a selective amplifier 6. The amplified voltage is then converted by a Schmitt trigger circuit 7 to a digital signal, which is fed to a pulse counting circuit 8. The latter triggers a switching device 9 when a predetermined number of tooth-indicating pulses have been received.

Figure 2:
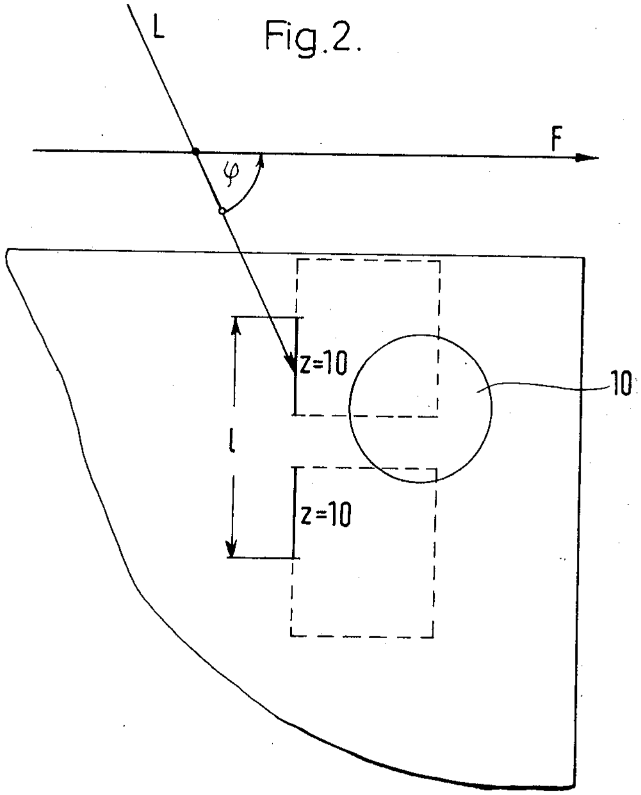
FIG. 2 is a top plan view from which limiting positions of a stamp affixed to an envelope are apparent.

Referring to FIG. 2, to ensure an optimum illumination of the perforated edge of stamp 2 which is to be scanned, the light rays L make an angle of about 60° with the direction of travel F. FIG. 2 indicates also the limiting locations for postage stamp 2 and the length 1 in which a line must be scanned, provided that in case of a stamp affixed in a very low position an indicating signal is desired only when stamp 2 bears a stamp mark (cancellation stamp) 10. When it is assumed that ten teeth must be scanned for an indication of a stamp, the values which are obtained will depend on the location and size of the stamp mark and will be 1=40 mm, on an average.

The number of diodes of the linear diode array of device 4 must comprise such a number of diodes that stamps having, e.g., 14 teeth per 20 mm can be scanned so that $14\times2=28$ teeth are detected. Whereas a sinusoidal light pattern along the perforated edge could be detected if it were scanned at only two points per period, i.e., with a total of $2\times28=56$ diodes, the linear diode array of the apparatus according to the present invention desirably comprises 256 diodes so that the pulselike light pattern can be detected.

Pulse generator 5 controls the linear diode array in such a manner that there is an uninterrupted sequence of scans and postage stamp 2 is scanned line by line as the envelope is advanced by belt conveyor 1. Because the speed of travel of the envelope is determined by conveyor 1 and is approximately constant, the width of the scanned strips, i.e., the line spacing, can be controlled by the frequency of the controlling pulse generator 5. For instance, if the pulse frequency of the controlling pulse generator 5 is 500 kHz (kilohertz), the linear diode array comprises 256 diodes, and the envelope travels at a speed of 3 meters per second, each strip will have a width of $(1/500{,}000)\times256\times3=0.00154$ meter$=1.54$ mm. The width of the strip need not be restricted to the width of the illuminated perforated edge portion because the electrical charges representing the light pulses received during each scan are stored by the linear diode array as electric charges until the next scan. The larger the width of each strip, the easier is the detection of stamps affixed in an oblique position. A limit is imposed, however, by the fact that the scanned area will be increased too, so that interfering light pulses may be received.

While I have described above the principles of my invention in connection with specific apparatus it is to be clearly understood that this description is made only by way of example and not as a limitation to the scope of my invention as set forth in the objects thereof and in the accompanying claims.

I claim:

1. Apparatus for detecting a perforated postage stamp on envelopes travelling in a given direction comprising:
- a light source directed to illuminate teeth of a perforated edge of said stamp at a right angle to said given direction;
- a scanning device disposed to receive light from said illumination edge of said stamp and to produce a high frequency pulse train responsive to scanning said teeth of said illuminated edge of said stamp; and
- an evaluating circuit coupled to said scanning device responsive to said pulse train to provide an indication signal indicating the presence of said stamp.

2. Apparatus according to claim 1, wherein said scanning device includes
- an electronically scannable linear array of photodiodes.

3. Apparatus according to claim 2, wherein said evaluating circuit includes
- a selective amplifier coupled to said array,
- a Schmitt trigger circuit coupled to said amplifier, and
- a pulse counting circuit coupled to said trigger circuit.

4. Apparatus according to claim 1, wherein said evaluating circuit includes
- a selective amplifier coupled to said scanning device,
- a Schmitt trigger circuit coupled to said amplifier, and
- a pulse counting circuit coupled to said trigger circuit.

5. Apparatus according to claim 4, wherein said pulse counting circuit provides said indication signal after receipt of a predetermined, adjustable number of pulses and is reset to zero count when said predetermined number of pulses is not received or when the frequency of said pulses received does not correspond to the pitch of said teeth of said illuminated edge of said stamp.

6. Apparatus according to claim 5, wherein said pulse counting circuit is desabled when said indicating signal is produced until the next envelope is to be checked.

7. Apparatus according to claim 4, wherein said pulse counting circuit is disabled when said indicating signal is produced until the next envelope is to be checked.

8. Apparatus according to claim 5, wherein said scanning device includes
- a spherical lens system, and
- a self-scanned linear array of diodes, the number of said diodes in said array being a multiple of the number of said teeth of said illuminated edge of said stamp.

9. Apparatus according to claim 8, wherein at least one of said scanning device and said evaluating circuit stores information obtained from each scanned line and delivers said information from one scanned line together with said information from the next scanned line.

10. Apparatus according to claim 4, wherein said scanning device includes a spherical lens system, and a self-scanned linear array of diodes, the number of said diodes in said array being a multiple of the number of said teeth of said illuminated edge of said stamp.

11. Apparatus according to claim 10, wherein at least one of said scanning device and said evaluating circuit stores information obtained from each scanned line and delivers said information from one scanned line together with said information from the next scanned line.

12. Apparatus according to claim 1, wherein said scanning device includes a spherical lens system, and a self-scanned linear array of diodes, the number of said diodes in said array being a multiple of the number of said teeth of said illuminated edge of said stamp.

13. Apparatus according to claim 12, wherein at least one of said scanning device and said evaluating circuit stores information obtained from each scanned line and delivers said information from one scanned line together with said information from the next scanned line.

14. Apparatus according to claim 1, wherein at least one of said scanning device and said evaluating circuit stores information obtained from each scanned line and delivers said information from one scanned line together with said information from the next scanned line.

* * * * *